No. 673,577. Patented May 7, 1901.
I. H. JEWELL.
MEANS FOR CLEANING SETTLING BASINS.
(Application filed Jan. 25, 1901.)
(No Model.) 2 Sheets—Sheet 1.
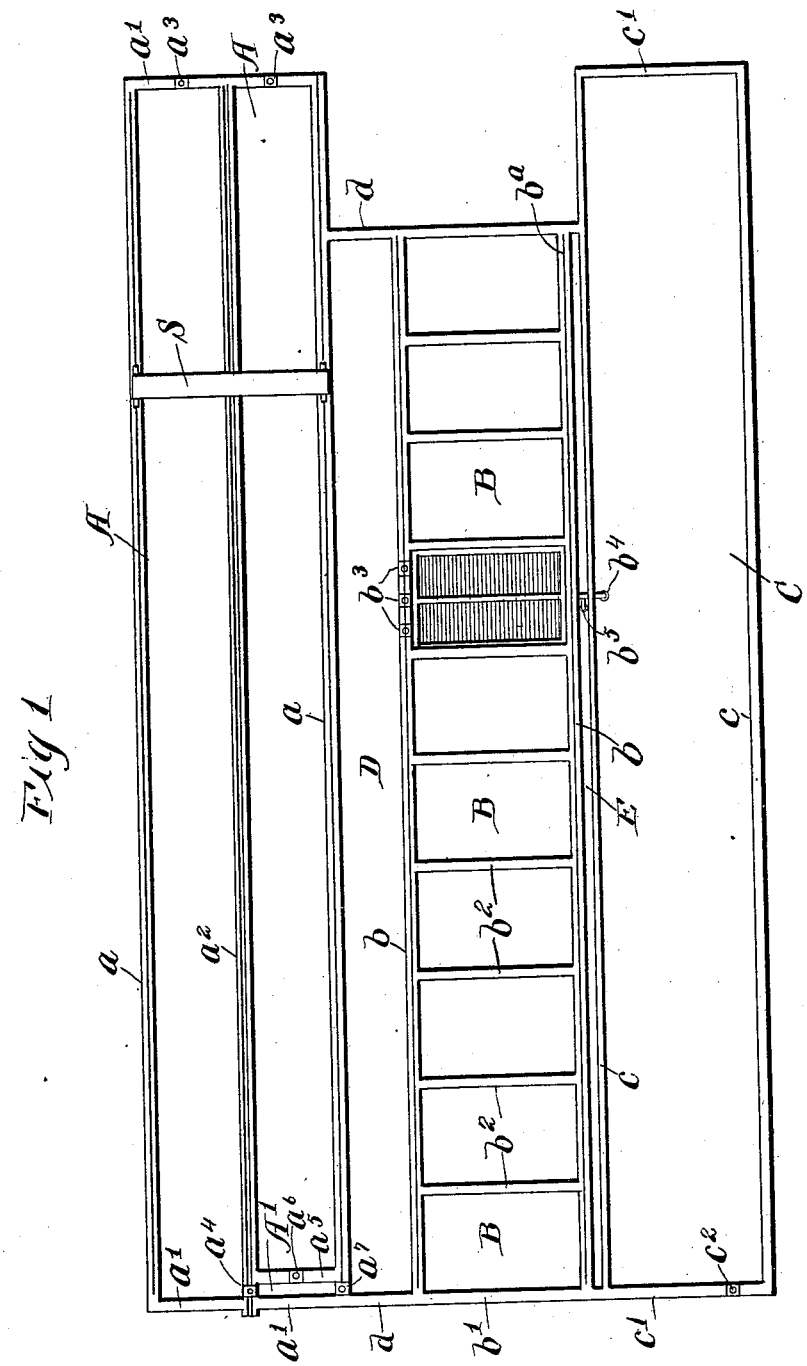
Witnesses: Carl H. Crawford, William L. Hall
Inventor: Ira H. Jewell
by Poole & Brown his Attorneys

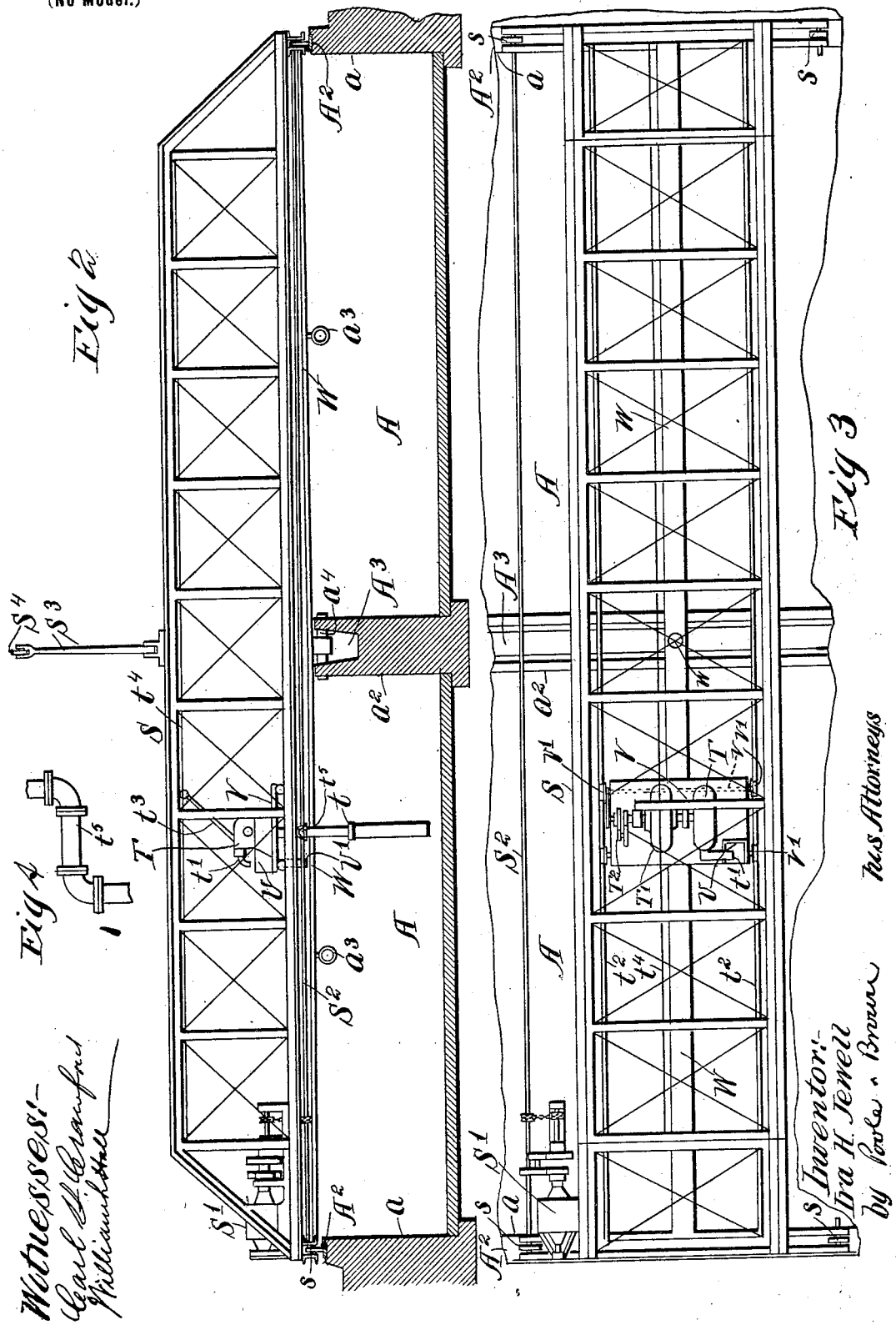

UNITED STATES PATENT OFFICE.

IRA H. JEWELL, OF CHICAGO, ILLINOIS.

MEANS FOR CLEANING SETTLING-BASINS.

SPECIFICATION forming part of Letters Patent No. 673,577, dated May 7, 1901.

Original application filed April 10, 1900, Serial No. 12,319. Divided and this application filed January 25, 1901. Serial No. 44,718. (No model.)

*To all whom it may concern:*

Be it known that I, IRA H. JEWELL, of Chicago, in the county of Cook and State of Illinois, have invented certain new and useful Improvements in Means for Cleaning Settling-Basins; and I do hereby declare that the following is a full, clear, and exact description thereof, reference being had to the accompanying drawings, and to the letters of reference marked thereon, which form a part of this specification.

This invention relates to means for removing sediment from the bottoms of liquid-settling basins; and the object of the invention is to provide an improved construction for doing this work without interrupting the usual operation of the basin and to generally improve the operation of settling-basins.

The invention is herein shown applied to settling-basins employed in connection with a water-filtering plant wherein the raw water is subjected to sedimentation before being directed to the filter units.

The invention consists of the matters hereinafter set forth, and more particularly pointed out in the appended claims.

In the drawings, Figure 1 is a diagrammatic view, in top plan, of a filter plant, showing a series of adjacent filter units and settling-tanks in communication therewith and a cleaning device for the basins. Fig. 2 is a cross-section taken through the settling-basins, showing the cleaning device and support therefor in elevation. Fig. 3 is a plan view of the parts shown in Fig. 2. Fig. 4 is a detail view of the hinge in the pump-spout.

As shown in said drawings, A A designate two adjacent settling-basins, which are inclosed by side walls $a\ a$ and end walls $a'\ a'$ and separated by a division-wall or partition $a^2$, extending the entire length thereof, each made rectangular and of considerably greater length than width and each provided with a valved inlet-opening $a^3$. At one side of said settling-basins are located a series of adjacent filter units B, arranged in a row extending parallel with said basins. Said filter units are inclosed by side and end walls $b\ b'$, respectively, and the several units are separated by division-walls $b^2$. At the side of said series of filter units is located a filtered-water reservoir C, inclosed by side and end walls $c$ and $c'$, respectively. Between said settling-basins and the series of filter units is located a settled-water channel D of a length equal to the series of filter units. Said channel is bounded at its sides by the walls $a\ b$ of the basin and filter units, respectively, and at its ends by transverse walls $d\ d$, extending between the longitudinal walls $a$ and $b$. Said channel is here shown as made of considerable capacity, but may be made smaller, if desired, or have the form of a pipe or flume.

The walls of the settling-basins, the filter units, and the reservoir, as well as those of the channel D when the filter is made of large area, will desirably be made of masonry construction, though metal walls may in some instances be employed, and the several units of the plant may be located farther apart than shown.

The dividing-wall $a^2$ between the settling-basins is provided at one end thereof, near the top of the wall, with a valved conduit $a^4$, which leads into a transverse chamber or conduit A', formed at the end of the basin nearest the filter units, between a short transverse wall $a^5$ (extending from one side wall $a$ to the division-wall $a^2$) and the adjacent wall of the basin. The other basin A communicates with said chamber through a valved conduit $a^6$ in the wall $a^5$, and the chamber A' communicates with the channel D through a valved passage $a^7$ in the side wall $a$ of the basin. The channel D communicates with each filter unit by means of one or more valved conduits $b^3$ in the wall $b$.

B' designates the filter-bed bottom, through which the filtered water is discharged into a chamber below the same. (Not shown.) Said chamber communicates with the reservoir through an effluent-pipe $b^4$, leading through the walls $b\ c$. Said effluent-pipe is provided between the walls with a valved branch pipe $b^5$, which discharges into a conduit E, between the series of filter units and the reservoir, and which conduit is designed to lead to a sewer.

The operation of the filter constructed as thus described is as follows: The raw water is discharged into the settling-basins through the passages $a^3$ $a^3$, and from thence is discharged into the settled-water channel through the passages $a^4$, $a^6$, and $a^7$ and chamber $A^7$. From the channel the settled water is delivered to the filter units through the valved pipes or passages $b^3$ and is discharged from the filtered-water chambers of the several units through the pipes $b^4$ into the reservoir C, where the water is stored and conducted through one or more valved passages $c^2$, which are designed to be connected with the city mains or the like. With the use of the two basins connected, as described, with the filter units the period of sedimentation of the water may be increased to correspond with the condition of the water, whereby uniform results in the filtered water may be secured notwithstanding different conditions of the raw water. The branch pipe $b^5$, connected with the filtered-water-effluent pipe and discharging into the sewer-conduit, is provided for the purpose of directing a portion or all of the filtered water to the sewer at such time when the quality of the water is below the reservoir standard. It sometimes occurs that certain of the filter units work badly by reason of improper attention thereto, so that the effluent is below the required standard and should not be discharged into the reservoir to pollute the properly-filtered water therein. In such event the effluent-pipe of the unit in bad order may be closed and the branch pipe opened, which discharges the water to the sewer until the filtered water is satisfactory.

The bottoms of the settling-basins become foul by reason of the sedimentation of the water passing therethrough, so that it is necessary at intervals to remove such sediment from the basins.

Now describing the construction for removing the sediment from the basins the same is made as follows: S designates a traveling crane located over and spanning the settling-basins from one side to the other and traveling on tracks or rails $A^2$, laid on the upper faces of the side walls $a$ of the basins, from one end to the other thereof. Said crane carries a pumping or lifting device consisting, essentially, of a rotary pump T, having a suction-spout $t$, which is adapted to reach to the bottoms of the settling-basins to lift the mud therefrom, and a discharge-spout $t'$, which discharges into a hopper U at the side of the pump. Said pump and hopper are carried on a truck V, which travels on rails $t^2$, extending longitudinally of the crane, whereby the lifting device is given a movement transversely of the basin, as well as longitudinally thereof, so as to be able to pass over the entire horizontal area of the settling-basins. Said hopper is provided with a discharge chute or spout $U'$, which is designed to discharge the mud lifted by the pump into a trough W, carried by the crane and extending from one side to the other thereof. Said trough consists, as herein shown, of two sections, each of which inclines from the outer ends of the crane toward the division-wall $a^2$ of the basins, and is provided at its lowest part with a discharge-chute $w$, which discharges into an elongated depression or conduit $A^3$ in the upper side of the division-wall or partition $a^2$. Said conduit $A^3$ is inclined from one end of the wall to the other, whereby the sediment discharged therein by the lifting device is carried outside of the settling structure.

The crane S is given motion through an electric motor $S'$, located at one side thereof and suitably geared to a shaft $S^2$, extending between and connecting two of the supporting-wheels $s$ at one side of the crane and constituting the traction-wheels therefor. A trolley $S^3$, traveling in contact with an overhead conductor $S^4$, transmits current to said actuating-motor. Similarly the pump T and the transversely-movable truck V are actuated by an electric motor $T'$, located on the truck at the side of the pump. Said motor is shown as connected directly with the pump and connected by suitable reducing-gears $T^2$ with a transverse shaft $v$, on which two of the supporting-wheels $v'$ of the truck, at one side thereof, are mounted.

Suitable clutch mechanisms will be provided (not shown) for independently controlling the action of the pump and truck or actuating the same together, as desired. Said truck is provided with a trolley $t^3$, which travels in contact with a conductor $t^4$, extending longitudinally of the crane, and which conductor is in circuit with the conductor $S^4$. The suction-spout is made telescopic to permit it to be raised and lowered from and toward the bottoms of the basins. Said spout $t$ of the pump is provided with a hinged joint $t^5$, (see Fig. 4,) located above the level of the wall $a^2$, whereby said spout may be lifted over said wall when the lifting device is shifted from one settling-basin to the other; but said spout for this purpose may be otherwise made. Said lifting device may be operated to lift the sediment from the bottom of either of the basins at the time the basin is in communication with the settled-water channel and without disturbing the operation of the basin, as the lower end of the suction-spout is near the bottom of the basin and the upward movement of the sediment is confined to the suction-spout and will not remix said sediment with the supernatant water.

A main or principal advantage of the construction described for cleaning the settling-basin is that the sediment may be removed from the basin without disturbing the usual operation of the basin and without the necessity of withdrawing the liquid being treated from the basin. It is therefore practicable to maintain the basin in constant operation and to avoid wastage of the liquid resulting in the withdrawal of the same from the basin when the sediment is to be cleaned therefrom as well as the time heretofore necessarily employed in discharging the liquid from the basin. Moreover, said means of cleaning the basin when used in connection with settling-basins wherein a coagulant is employed to aid in settling the liquid enables a great saving in the use of the coagulant, as it avoids the necessity of withdrawing from the basin the liquid charged with the coagulant.

Many changes may be made in the details of construction described, to adapt the same to various locations and for various uses, and I do not wish to be limited to such construction except as hereinafter made the subject of specific claims.

The arrangement of the several parts of the plant shown in Fig. 1 of the drawings is claimed in another application for United States Letters Patent filed by me of even date herewith, which application and the present application have been divided from my prior application filed by me on the 10th day of April, 1900, Serial No. 12,319.

I claim—

1. The combination with a settling-tank for liquids provided with means for continuously receiving and discharging the liquid, of a suction device provided with a depending and upwardly-movable spout having its intake end located near the bottom of the basin and constructed to remove sedimentary matter from the basin during the usual operation of the basin without liability of remixing the sediment withdrawn with the supernatant liquid.

2. The combination with a settling-basin for liquids provided with means for continuously receiving and discharging the liquid, of a pump supported above and traveling over the basin and having an upwardly-movable spout depending thereinto with its intake end located near the bottom of the basin for lifting the sediment from the bottom of the basin, and means connected with the pump for discharging the sediment outside of the basin, the operation being carried on without interrupting the usual operation of the basin.

3. The combination with a plurality of independent settling-basins located side by side, of a pump traversing the length of the basins and having its spout designed to depend into the basins with its intake end near the level of the bottoms thereof for lifting the sediment from the basins, and means for shifting the pump laterally from one basin to the other, said spout being capable of being lifted above the level of the wall separating the basins.

4. A filter plant comprising a series of settling-basins having communication with a raw-water supply, a settled-water channel or conduit, a filter-bed in communication with said water channel or conduit and means for mechanically removing the sediment from the bottom of the settling-basin and directing it outside the basin without interrupting the usual operation of the basin.

5. A filtering plant comprising a settling-basin having communication with a raw-water supply, a settled-water channel or conduit communicating with the basin, and a filter-bed in communication with said water channel or conduit, said settling-basin being provided in its walls with a sediment-carrying channel.

6. The combination with a plurality of settling-tanks located side by side and separated by a division-wall, a sediment-carrying channel in the division-wall, and means for directing the sediment from the bottoms of said basins to the adjacent channel of the division-wall.

In testimony that I claim the foregoing as my invention I affix my signature, in presence of two witnesses, this 23d day of January, A. D. 1901.

IRA H. JEWELL.

Witnesses:
WILLIAM N. HALL,
GERTRUDE BRYCE.